(12) United States Patent
MacFarlane et al.

(10) Patent No.: US 9,371,909 B2
(45) Date of Patent: Jun. 21, 2016

(54) METHOD OF CONTROLLING A TRANSMISSION PARK SYSTEM OF A VEHICLE EQUIPPED WITH AN ELECTRONIC TRANSMISSION RANGE SELECT SYSTEM

(71) Applicant: GM GLOBAL TECHNOLOGY OPERATIONS LLC, Detroit, MI (US)

(72) Inventors: Brian A. MacFarlane, Fenton, MI (US); Orson S. Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 14/340,651

(22) Filed: Jul. 25, 2014

(65) Prior Publication Data

US 2016/0025217 A1  Jan. 28, 2016

(51) Int. Cl.
*F16H 59/44*   (2006.01)
*F16H 63/48*   (2006.01)
*F16H 61/12*   (2010.01)

(52) U.S. Cl.
CPC .............. *F16H 63/483* (2013.01); *F16H 59/44* (2013.01); *F16H 61/12* (2013.01); *F16H 2061/1284* (2013.01)

(58) Field of Classification Search
None
See application file for complete search history.

(56) References Cited

U.S. PATENT DOCUMENTS

| | | | |
|---|---|---|---|
| 4,892,014 A * | 1/1990 | Morell | F16H 59/08 |
| | | | 192/222 |
| 7,735,619 B2 | 6/2010 | Kato et al. | |
| 2002/0115527 A1* | 8/2002 | Miyata | F16H 61/12 |
| | | | 477/34 |
| 2010/0197456 A1* | 8/2010 | Steinhauser | F16H 63/483 |
| | | | 477/92 |
| 2012/0022754 A1* | 1/2012 | Ueno | F16H 61/12 |
| | | | 701/58 |
| 2012/0136543 A1* | 5/2012 | Jang | F16H 61/0059 |
| | | | 701/53 |

* cited by examiner

*Primary Examiner* — Edwin A Young
(74) *Attorney, Agent, or Firm* — Quinn Law Group, PLLC

(57) ABSTRACT

A method of controlling a transmission of a vehicle equipped with an electronic transmission range select system includes receiving an electronic request to actuate a transmission park system. A speed of the vehicle is sensed with each of a plurality of different speed sensors to define a plurality of different sensed vehicle speeds. Each of the plurality of different speed sensors provides a sensed vehicle speed that is independent and separate from the sensed vehicle speed from all of the other speed sensors. All of the different sensed vehicle speeds from the plurality of speed sensors is compared to each other to determine the lowest sensed vehicle speed. When the lowest sensed vehicle speed is equal to or less than a maximum allowable actuation speed, an electronic signal is sent from the transmission control unit to the transmission park system to actuate the transmission park system.

20 Claims, 2 Drawing Sheets

METHOD OF CONTROLLING A TRANSMISSION PARK SYSTEM OF A VEHICLE EQUIPPED WITH AN ELECTRONIC TRANSMISSION RANGE SELECT SYSTEM

TECHNICAL FIELD

The invention generally relates to a method of controlling an electronically actuated transmission park system of a vehicle equipped with an electronic transmission range select system.

BACKGROUND

Traditional vehicles having an internal combustion engine include a transmission having a transmission park system. The transmission park system typically includes a park pawl that mechanically engages a park gear that is splined to an output shaft of the transmission. The park pawl engages the park gear to prevent rotation of the output shaft, thereby preventing rotation of the drive wheels coupled to the transmission. The transmission park system may be mechanically actuated by moving a lever into a park position. Alternatively, if the vehicle is equipped with an electronic transmission range select system, wherein the transmission is actuated by electronic control signals instead of mechanical linkages, the transmission park system may be actuated by engaging an electronic button or rotary dial. Engaging or actuating the transmission park system when the vehicle is moving, particularly at higher speeds, may damage the transmission park system. A transmission control unit of a vehicle equipped with the electronic transmission range select system, typically prevents actuation of the transmission park system when the vehicle is traveling at a speed greater than a maximum allowable actuation speed.

SUMMARY

A method of controlling an electronically actuated transmission park system of a vehicle is provided. The method includes sensing a speed of the vehicle with each of a plurality of different speed sensors, to define a plurality of different sensed vehicle speeds. Each of the plurality of different speed sensors provides a sensed vehicle speed that is independent and separate from the sensed vehicle speeds of all of the other speed sensors. All of the different sensed vehicle speeds from the plurality of speed sensors are compared to each other to determine the lowest sensed vehicle speed. The transmission park system is actuated when the lowest sensed vehicle speed is equal to or less than a maximum allowable actuation speed.

A method of controlling a transmission of a vehicle is also provided. The method includes receiving an electronic request, with a transmission control unit, to actuate a transmission park system of the transmission. A speed of the vehicle is sensed with each of a plurality of different speed sensors to define a plurality of different sensed vehicle speeds. Each of the plurality of different speed sensors provides a sensed vehicle speed that is independent and separate from the sensed vehicle speed from all of the other speed sensors. All of the different sensed vehicle speeds from the plurality of speed sensors is compared to each other to determine the lowest sensed vehicle speed. An electronic signal is sent from the transmission control unit to the transmission park system to actuate the transmission park system, when the lowest sensed vehicle speed is equal to or less than a maximum allowable actuation speed.

Accordingly, the transmission control unit uses a vehicle speed sensed from each of a plurality of different speed sensors, such as wheel speed sensors, transmission output shaft speed sensors, or electric propulsion motor speed sensors, to determine a plurality of different sensed vehicle speeds, i.e., one sensed vehicle speed is determined for each speed sensor. The transmission control unit uses the lowest sensed vehicle speed as the speed of the vehicle. The transmission control unit may apply the transmission park system when the lowest sensed vehicle speed of the vehicle is equal to or less than the maximum allowable actuation speed. By using the lowest sensed speed obtained from the plurality of different speed sensors, the transmission control unit may provide robust and safe actuation of the transmission park system The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
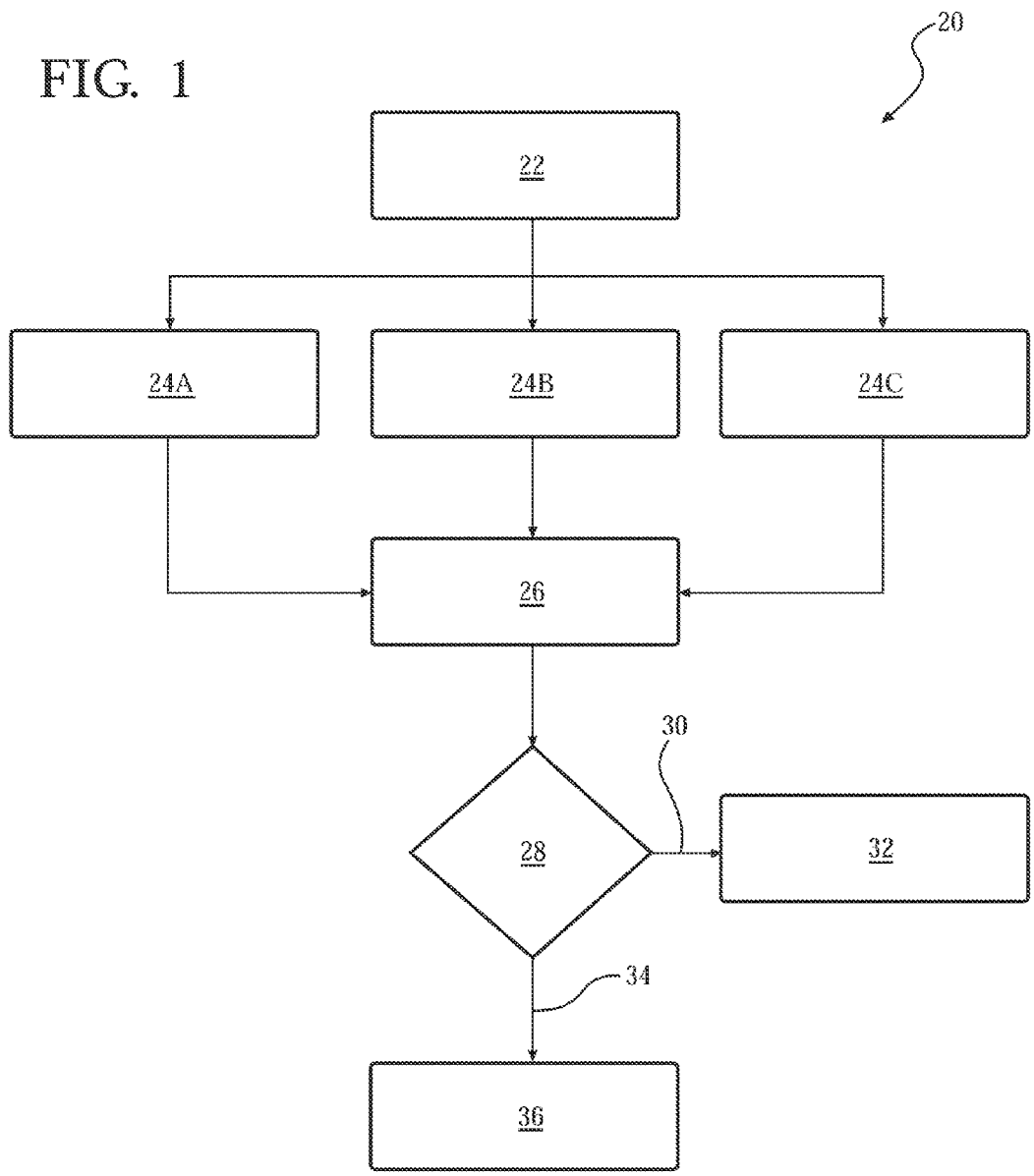
FIG. 1 is a flowchart showing a method of controlling an electronic transmission park system of a vehicle.

Referring to the Figures, a method of controlling a transmission of a vehicle, and more specifically a method of controlling an electronically actuated transmission park system of a vehicle, is generally shown in FIG. 1, and described herein. The vehicle may include any type and/or style of a vehicle having a primary power source coupled to a transmission. The primary power source may include, but is not limited to, a gasoline or diesel engine, either alone or in combination with an electric motor. The primary power source generates a torque, which is transmitted to the transmission. The transmission may include a multi-speed transmission, which transmits the torque to a differential or final drive. The multi-speed transmission increases the overall operating range of the vehicle by permitting the power source, e.g., an engine, to operate through its torque range a number of times. The number of forward speed ratios that are available in the transmission determines the number of times the engine torque range is repeated.

The vehicle may be equipped with an electronic transmission range select system for electronically selecting an operating mode of a transmission. The different operating modes of the transmission may include, but are not limited to, a forward drive mode, a reverse drive mode, a neutral mode, and a park mode. The electronic transmission range select system is an electronic system that uses an electronic input, such as through a switch, dial, or button, to select the desired operating mode of the transmission. A transmission control unit receives the electronic input, and sends an electronic control signal to the transmission to control the operation of the transmission electronically.

The transmission includes a transmission park system, which is used to rotatably lock a shaft of the transmission, such as but not limited to an output shaft of the transmission. The transmission park system may include, for example, a park pawl that mechanically engages a park gear that is splined to the output shaft of the transmission. The park pawl engages the park gear to prevent rotation of the output shaft, thereby preventing rotation of the drive wheels coupled to the transmission. Accordingly, when engaged, the transmission park system prevents rotation of the output shaft of the transmission, and thereby prevents rotation of the wheels of the vehicle. When disengaged, the transmission park system allows rotation of the output shaft of the transmission, thereby allowing rotation of the wheels of the vehicle, and allowing torque communication between the power source and the wheels.

As noted above, the electronic transmission range select system is used to select the different operating modes of the transmission, including the park mode. Accordingly, the actuation of the transmission park system is controlled by the electronic transmission range select system. A driver may enter an input, such as by depressing a button or rotating a dial to select engagement or disengagement of the park mode. When the driver requests actuation of the transmission park system to engage the transmission park system and place the transmission into the park mode, a signal is sent to the transmission control unit indicating the requested actuation of the transmission park system. The transmission control unit then determines if the transmission park system may be engaged.

In order to prevent damage to the transmission park system, the transmission park system should only be engaged to place the transmission in the park mode when the vehicle is stopped or moving at a speed that is equal to or less than a maximum allowable actuation speed. The maximum allowable actuation speed is defined herein as the maximum speed that the vehicle may be moving and still allow the transmission park system to be engaged without significant risk of damaging the transmission park system. Accordingly, if the vehicle is moving at a speed greater than the maximum allowable actuation speed, the transmission control unit will prevent actuation of the transmission park system, and not place the vehicle in the park mode.

In order for the transmission control unit to determine the speed of the vehicle relative to the maximum allowable actuation speed, the transmission control unit must learn the current operating speed of the vehicle. The transmission control unit may learn the speed of the vehicle through a single speed sensor, such as a wheel speed sensor. However, if the single wheel speed sensor malfunctions or sends a false speed indication, the transmission control unit may fail to engage the transmission park system, even when the vehicle is stopped or operating at a speed equal to or less than the maximum allowable actuation speed. In order to prevent the transmission control unit from failing to engage the transmission park system when the vehicle is operating at a speed equal to or less than the maximum allowable actuation speed, the method described herein teaches that the transmission control unit uses a plurality of different speed sensors to determine the speed of the vehicle. Accordingly, even if one of the different speed sensors fails or provides a false speed indication, the remaining speed sensors may be used to learn the actual and correct speed of the vehicle, allowing the transmission control unit to make a proper and accurate determination of whether or not to engage the transmission park system.

The method of controlling the transmission, and more specifically to controlling the electronically actuated transmission park system, includes providing the transmission control unit. The transmission control unit may include a computer and/or processor, and include all software, hardware, memory, algorithms, connections, sensors, etc., necessary to manage and control the operation of the transmission, including the transmission park system. As such, the method, described below and generally shown at 20 in FIG. 1, may be embodied as a program operable on the transmission control unit. It should be appreciated that the transmission control unit may include any device capable of analyzing data from various sensors, comparing data, making the necessary decisions required to control the operation of the transmission and/or the transmission park system, and executing the required tasks necessary to control the operation of the transmission and/or the transmission park system. Accordingly, the transmission control unit is operable to perform the various steps and/or tasks of the method described below.

Referring to FIG. 1, the method 20 includes requesting actuation of the transmission park system, generally indicated by box 22. As described above, a driver may request actuation of the transmission parks system by, for example, pressing a button, or rotating a dial to send an electronic signal to the transmission control unit. The transmission control unit receives the electronic signal indicating that actuation of the transmission park system has been requested, and then determines whether or not the vehicle is moving at or below or the maximum allowable actuation speed, or above the maximum allowable actuation speed.

Once the transmission control unit receives the request to actuate the transmission park system, the transmission control unit senses or determines a speed of the vehicle, generally indicated by boxes 24A, 24B, 24C. As noted above, the transmission uses a plurality of different speed sensors to separately sense and/or determine the speed of the vehicle. The transmission control unit uses each of the different speed sensors to define and/or calculate a sensed vehicle speed. Accordingly, the transmission control unit calculates a sensed vehicle speed for each individual speed sensor used. As such, the transmission control unit defines and/or calculates a plurality of different sensed vehicle speeds, with each of the different speed sensors providing one of the sensed vehicle speeds, and with the sensed vehicle speed from each of the different speed sensors being an independent and separate value from the sensed vehicle speeds of all of the other speed sensors. Boxes 24A, 24B, and 24C each represent a sensed vehicle speed from a different speed sensor. While only three different sensed vehicle speeds are shown, it should be appreciated that any number of sensed vehicle speeds may be determined. It should be appreciated that while each speed sensor is used to generate one sensed vehicle speed, i.e., one single value for each speed sensor, the actual value of the sensed vehicle speeds for all of the different speed sensors may be the same. In other words, all of the different speed sensors may sense the identical or similar vehicle speed.

The plurality of speed sensors may include, but is not limited to, at least one of a wheel speed sensor, a transmission output shaft speed sensor, or an electric propulsion motor speed sensor. For example, the transmission control unit may use a wheel speed sensor disposed at each wheel of the vehicle. As such, each of the wheel speed sensors will independently sense the rotational speed of their respective wheel and communicate it to the transmission control unit. In addition to the wheel speed sensors, the transmission control unit may use the transmission output shaft speed sensor to sense a rotational speed of the output shaft of the transmission, and/or the electric propulsion motor speed sensor to sense a rotational speed of an electric propulsion motor. One or more of the speed sensors may include a Hall Effect based sensor. As is generally understood, a Hall Effect based sensor is a transducer that varies its output voltage in response to magnetic field to sense or detect rotational speed. The method described herein is particularly useful for vehicles using Hall Effect based sensors, because the Hall Effect based sensors may spike when the vehicle is nearly stopped due to the poor fidelity of the signal at low speeds, thereby providing an inaccurate estimate of the sensed speed of its respective rotational element. However, by using multiple speed sensors, as described herein, the possibility that the transmission control unit may fail to engage the transmission park system due to a faulty signal from a single speed sensor is greatly reduced.

Sensing the speed of the vehicle with each of the plurality of different speed sensors may include, for example, each sensor sensing data related to rotation of a rotating element. For example, a wheel speed sensor may sense rotation of a respective wheel of the vehicle. The data related to the rotational speed of their respective rotating element is transmitted to the transmission control unit by each respective speed sensor. The transmission control unit may then use the data received from each individual speed sensor to calculate a vehicle speed for that respective speed sensor.

Once the transmission control unit has sensed and/or determined all of the different sensed vehicle speeds from all of the different speed sensors, the transmission control unit compares all of the different sensed vehicle speeds to each other to determine the lowest sensed vehicle speed, generally indicated by box 26.

One of the different speed sensors may be defined as a default speed sensor. The default speed sensor is the preferred speed sensor to use when selecting the lowest sensed speed. The sensed vehicle speed from the default speed sensor is selected as the lowest sensed vehicle speed when the sensed vehicle speed from the default speed sensor and at least one other of the plurality of speed sensors are substantially equal to each other, and are the lowest sensed vehicle speeds. The sensed vehicle speeds may be considered substantially equal to each other when their respective values are within a given percentage of each other or are within a given value of each other. For example, by way of a non-limiting example, the respective values between the sensed vehicle speeds may be considered substantially equal to each other when they are within 10% of each other, or are within a value of 5 kph of each other. For example, the default speed sensor may be defined as the transmission output shaft speed sensor. As such, when providing equal values of the sensed vehicle speed, the sensed vehicle speed from the transmission output shaft speed sensor is preferred, and used as the lowest sensed vehicle speed. However, if one of the other speed sensors provides a sensed vehicle speed that is substantially less than the default speed sensor, then the sensed vehicle speed from the default speed sensor is not defined as the lowest sensed vehicle speed.

Each of the plurality of speed sensors may be individually diagnosed by the transmission control unit using onboard diagnostic programs to determine if any of the plurality of speed sensors is not operating properly. If the transmission control unit determines or diagnoses that one of the different speed sensors is not operating properly, then the transmission control unit may exclude the sensed vehicle speed from the faulty speed sensor that is not operating properly from the comparison all of the different sensed vehicle speeds used to determine the lowest sensed vehicle speed. By so doing, the transmission control unit excludes potentially faulty data from the determination of whether the vehicle is moving faster than the maximum allowable actuation speed, or less than the maximum allowable actuation speed.

Once the lowest sensed vehicle speed from the plurality of different speed sensors has been identified, then the transmission control unit may then compare the lowest sensed vehicle speed to the maximum allowable actuation speed, generally indicated by box 28. The transmission control unit compares the lowest sensed vehicle speed to the maximum allowable actuation speed to determine if the lowest sensed vehicle speed is greater than the maximum allowable actuation speed, generally indicated at 30, or if the lowest sensed vehicle speed is equal to or less than the maximum allowable actuation speed, generally indicated at 34.

If the transmission control unit determines that the lowest sensed vehicle speed is greater than the maximum allowable actuation speed, generally indicated at 30, then the transmission control unit does not actuate the transmission park system, generally indicated by box 32.

If the transmission control unit determines that the lowest sensed vehicle speed is equal to or less than a maximum allowable actuation speed, generally indicated at 34, and it is therefore the control systems intention to engage the transmission park system, then the transmission control unit may proceed to actuate the transmission park system, generally indicated by box 36. As noted above, the transmission control unit may actuate the transmission park system by sending an electronic signal to the transmission park system, thereby causing the park pawl to engage the park gear and prevent rotation of the output shaft of the transmission.

Figure 2:
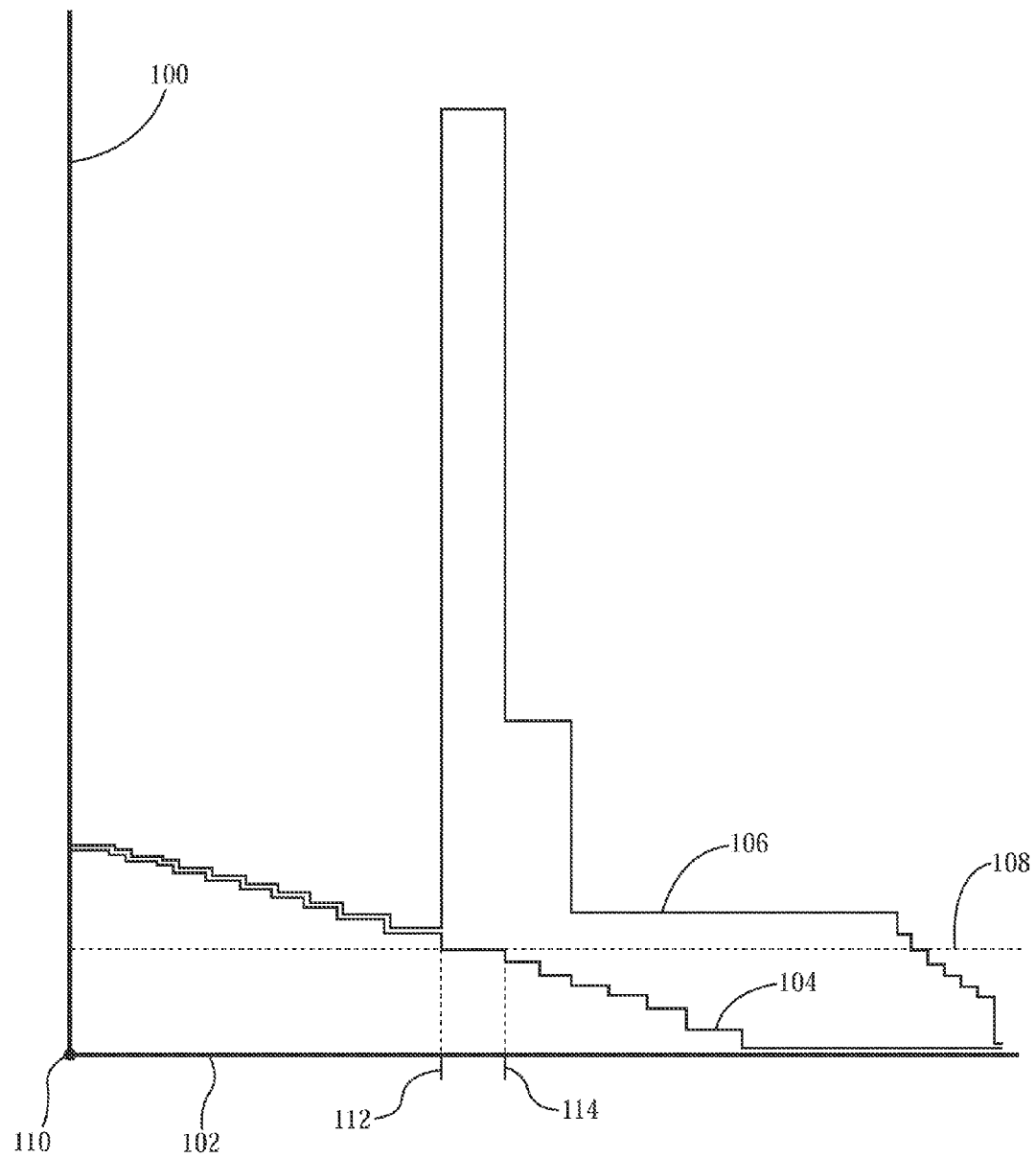
FIG. 2 is a graph showing different sensed vehicle speeds from different sensors over time.

For example, referring to FIG. 2, a graph showing two different sensed vehicle speeds is shown. Within FIG. 2, the sensed vehicle speed is shown along a vertical axis 100, and time is shown along a horizontal axis 102. A first sensed vehicle speed is shown by line 104, and a second sensed vehicle speed is shown by line 106. The maximum allowable actuation speed is generally indicated by line 108. As can be seen in FIG. 1, the first sensed vehicle speed 104 and the second sensed vehicle speed 106 define substantially identical vehicle speeds between an initial beginning time 110 and a second time 112, at which point the second sensed vehicle speed 106 provides an increased sensed vehicle speed compared to the first sensed vehicle speed 104. Accordingly, after the second time 112, the first sensed vehicle speed 104 is the lowest sensed vehicle speed, and is compared to the maximum allowable actuation speed 108. At a third time 114, the first sensed vehicle speed 104 decreases to a level that is equal to the maximum allowable actuation speed 108. Accordingly, prior to the third time 114, the transmission control unit would not actuate the transmission park system because the lowest sensed vehicle speed, i.e., the first sensed vehicle speed 104, is greater than the maximum allowable actuation speed 108. However, once reaching the third time 114, and at times after the third time 114, the lowest sensed vehicle speed, i.e., the first sensed vehicle speed 104, is equal to or less than the maximum allowable actuation speed, and the transmission control unit will actuate the transmission park system.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling an electronically actuated transmission park system of a vehicle, the method comprising:
sensing a speed of the vehicle with each of a plurality of different speed sensors to define a plurality of different sensed vehicle speeds, wherein each of the plurality of different speed sensors provides a sensed vehicle speed that is independent and separate from the sensed vehicle speeds of all of the other speed sensors;
comparing all of the different sensed vehicle speeds from the plurality of speed sensors to each other to determine the lowest sensed vehicle speed; and
actuating the transmission park system when the lowest sensed vehicle speed is equal to or less than a maximum allowable actuation speed.

2. A method as set forth in claim 1 further comprising requesting actuation of the transmission park system.

3. A method as set forth in claim 1 further comprising not actuating the transmission park system when the lowest sensed vehicle speed is greater than the maximum allowable actuation speed.

4. A method as set forth in claim 1 wherein the plurality of sensors includes at least one of a wheel speed sensor, a transmission output shaft speed sensor, or an electric propulsion motor speed sensor.

5. A method as set forth in claim 1 wherein at least one of the plurality of different sensors includes a hall effect based sensor.

6. A method as set forth in claim 1 wherein actuating the transmission park system includes sending an electronic signal to the transmission park system.

7. A method as set forth in claim 1 wherein sensing the speed of the vehicle with each of the plurality of different speed sensors includes:
each sensor sensing data related to rotation of a rotating element;
each sensor transmitting their respective data related to rotation of their respective rotating element to a transmission control unit; and
calculating a speed of the vehicle from the data from each respective sensor, with the transmission control unit.

8. A method as set forth in claim 1 further comprising individually diagnosing each of the plurality of speed sensors to determine if any of the plurality of speed sensors is not operating properly.

9. A method as set forth in claim 8 further comprising excluding the sensed vehicle speed from any of the plurality of speed sensors diagnosed as not operating properly from the comparison all of the different sensed vehicle speeds used to determine the lowest sensed vehicle speed.

10. A method as set forth in claim 1 further including defining one of the plurality of speed sensors as a default speed sensor, and wherein comparing all of the different sensed vehicle speeds from the plurality of speed sensors to each other to determine the lowest sensed vehicle speed includes selecting the sensed vehicle speed derived from the default speed sensor as the lowest sensed vehicle speed when the sensed vehicle speed from the default speed sensor and at least one other of the plurality of speed sensors are substantially equal to each other and are the lowest sensed vehicle speeds.

11. A method as set forth in claim 10 wherein the default speed sensor is a transmission output shaft speed sensor.

12. A method as set forth in claim 1 further comprising providing a transmission control unit operable to control the actuation of the transmission park system.

13. A method as set forth in claim 12 wherein the transmission control unit is operable to:
receive an electronic signal requesting actuation of the transmission park system;
receive sensed data from each of the plurality of different speed sensors;
calculate a sensed speed of the vehicle from the data received from each of the different speed sensors to define a plurality of different sensed vehicle speeds;
compare the plurality of different sensed vehicle speeds to determine which of the different sensed vehicle speeds is the lowest sensed vehicle speed;
compare the lowest sensed vehicle speed to the maximum allowable actuation speed to determine if the lowest sensed vehicle speed is less than, equal to, or greater than the maximum allowable actuation speed; and
actuate the transmission park system by sending an electronic signal to the transmission park system.

14. A method of controlling a transmission of a vehicle, the method comprising:
receiving an electronic request, with a transmission control unit, to actuate a transmission park system of the transmission;
sensing a speed of the vehicle with each of a plurality of different speed sensors to define a plurality of different sensed vehicle speeds, wherein each of the plurality of different speed sensors provides a sensed vehicle speed that is independent and separate from the sensed vehicle speed from all of the other speed sensors;
comparing all of the different sensed vehicle speeds from the plurality of speed sensors to each other to determine the lowest sensed vehicle speed; and
sending an electronic signal from the transmission control unit to the transmission park system to actuate the transmission park system when the lowest sensed vehicle speed is equal to or less than a maximum allowable actuation speed.

15. A method as set forth in claim 14 further comprising not actuating the transmission park system when the lowest sensed vehicle speed is greater than the maximum allowable actuation speed.

16. A method as set forth in claim 14 wherein the plurality of sensors includes at least one of a wheel speed sensor, a transmission output shaft speed sensor, or an electric propulsion motor speed sensor.

17. A method as set forth in claim 14 wherein at least one of the plurality of different sensors includes a hall effect based sensor.

18. A method as set forth in claim 14 wherein sensing the speed of the vehicle with each of the plurality of different speed sensors includes:
each sensor sensing data related to rotation of a rotating element;
each sensor transmitting their respective data related to rotation of their respective rotating element to the transmission control unit; and
calculating the speed of the vehicle from the data from each respective sensor, with the transmission control unit.

19. A method as set forth in claim 14 further comprising individually diagnosing each of the plurality of speed sensors to determine if any of the plurality of speed sensors is not operating properly.

20. A method as set forth in claim 19 further comprising excluding the sensed vehicle speed from any of the plurality of speed sensors diagnosed as not operating properly from the comparison all of the different sensed vehicle speeds used to determine the lowest sensed vehicle speed.

* * * * *